US007522223B2

(12) United States Patent
Umesako

(10) Patent No.: US 7,522,223 B2
(45) Date of Patent: Apr. 21, 2009

(54) AUDIO SIGNAL DELAY APPARATUS AND METHOD

(75) Inventor: Minoru Umesako, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 712 days.

(21) Appl. No.: 11/265,092

(22) Filed: Nov. 3, 2005

(65) Prior Publication Data

US 2006/0092322 A1 May 4, 2006

(30) Foreign Application Priority Data

Nov. 4, 2004 (JP) ............................ 2004-320203

(51) Int. Cl.
*H04N 7/01* (2006.01)

(52) U.S. Cl. ...................................... 348/738; 348/500

(58) Field of Classification Search ................. 348/500, 348/466, 472, 738, 726, 727, 515; 386/33, 386/39, 96; 369/59.21

See application file for complete search history.

(56) References Cited

U.S. PATENT DOCUMENTS 4,757,521 A * 7/1988 Korsky et al. ............... 375/358
5,003,557 A * 3/1991 Fujiyama .................... 375/357
5,055,924 A * 10/1991 Skutta ......................... 725/34
5,386,323 A * 1/1995 Ishiwata et al. ............. 386/104
5,627,592 A * 5/1997 Tichelaar et al. ......... 348/429.1
5,854,660 A * 12/1998 Tichelaar .................... 348/466
6,222,980 B1 * 4/2001 Asai et al. ...................... 386/65
6,757,341 B1 * 6/2004 Ema et al. ................... 375/333
7,099,256 B2 * 8/2006 Wada et al. .............. 369/59.21
7,206,648 B2 * 4/2007 Fujishita ....................... 700/94
7,308,188 B2 * 12/2007 Namatame ................... 386/39

FOREIGN PATENT DOCUMENTS

JP 2004-088442 3/2004

* cited by examiner

*Primary Examiner*—Paulos M Natnael
(74) *Attorney, Agent, or Firm*—Bacon & Thomas, PLLC

(57) ABSTRACT

In an audio signal delay apparatus and methods, an audio signal modulated by biphase mark modulation is received and a header part of the audio signal is identified. Thereafter, a data part of the audio signal is demodulated to store the identification data and the demodulated data part in a memory, the identification data from the memory is read out to reconstruct the header part after a specified time. Subsequently, the data part is read out from the memory to modulate the data part by the biphase mark modulation and the reconstructed header part is combined with the modulated data part to output the combined data. Preferably, the identification data is represented by two bits.

4 Claims, 7 Drawing Sheets

BEFORE MODULATION

AFTER MODULATION

AUDIO SIGNAL DELAY APPARATUS AND METHOD

FIELD OF THE INVENTION

The present invention relates to a technique for delaying an audio signal to be outputted.

BACKGROUND OF THE INVENTION

Since the start of the digital broadcasting, various types of images including SD (Standard Definition) and HD (High Definition) images are becoming more commonly available and familiar to the public viewers.

In order to view such various types of images provided by digital broadcasting systems, an image transform is required between SD images and HD images for displaying HD images on an SD image display device and vice versa.

In general, due to the time needed to make such an image transform, video signals become asynchronous to corresponding audio signals in their reconstruction. If the image transform is performed by using a same LSI that processes the audio signals, the video signals can be synchronized to the audio signals based on, e.g., time stamps. However, in case of a system in which the image transform such as a resolution conversion is performed by using an additional image processing LSI, the video signals become asynchronous to the audio signals.

To reduce the asynchronicity between the video and the audio signal, there is proposed a system for synchronizing the audio signal to the video signal by delaying the audio signal (for example, see Japanese Laid-Open Application No. 2004-88442). In accordance with this system, the audio signal is stored in a memory, and read out therefrom after a specified time to be outputted, so that the audio signal becomes synchronous to the video signal.

However, in case the audio signal is modulated by biphase mark modulation, which is widely used for commercial equipments, 2 bits are needed for representing 1 bit audio signal because of the characteristic of the biphase mark modulation. Therefore, a large memory capacity is needed if the audio signal modulated by the biphase mark modulation is directly stored in the memory.

SUMMARY OF THE INVENTION

It is, therefore, an object of the present invention to provide an audio signal delay apparatus for securing a sufficient delay time of the audio signal with a small memory capacity when the audio signal is modulated by the biphase mark modulation.

In accordance with one aspect of the present invention, there is provided an signal processing apparatus including: an audio signal delay apparatus which includes a header part detection unit for receiving an audio signal modulated by biphase mark modulation to identify a header part of the audio signal and output identification data; a biphase demodulation unit for demodulating a data part of the audio signal to store the identification data and the demodulated data part in a memory; and a biphase modulation unit for reading out the identification data from the memory to reconstruct the header part, reading out the data part from the memory to modulate the data part by the biphase mark modulation, and combining the reconstructed header part with the modulated data part to output the combined data.

In accordance with another aspect of the present invention, there is provided an audio signal delay method including the steps of: receiving an audio signal modulated by biphase mark modulation; identifying a header part of the audio signal; demodulating a data part of the audio signal to store identification data and the demodulated data part in a memory; reading out the identification data from the memory to reconstruct the header part after a specified time; reading out the data part from the memory to modulate the data part by the biphase mark modulation; and combining the reconstructed header part with the modulated data part to output the combined data.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENT

Figure 1:
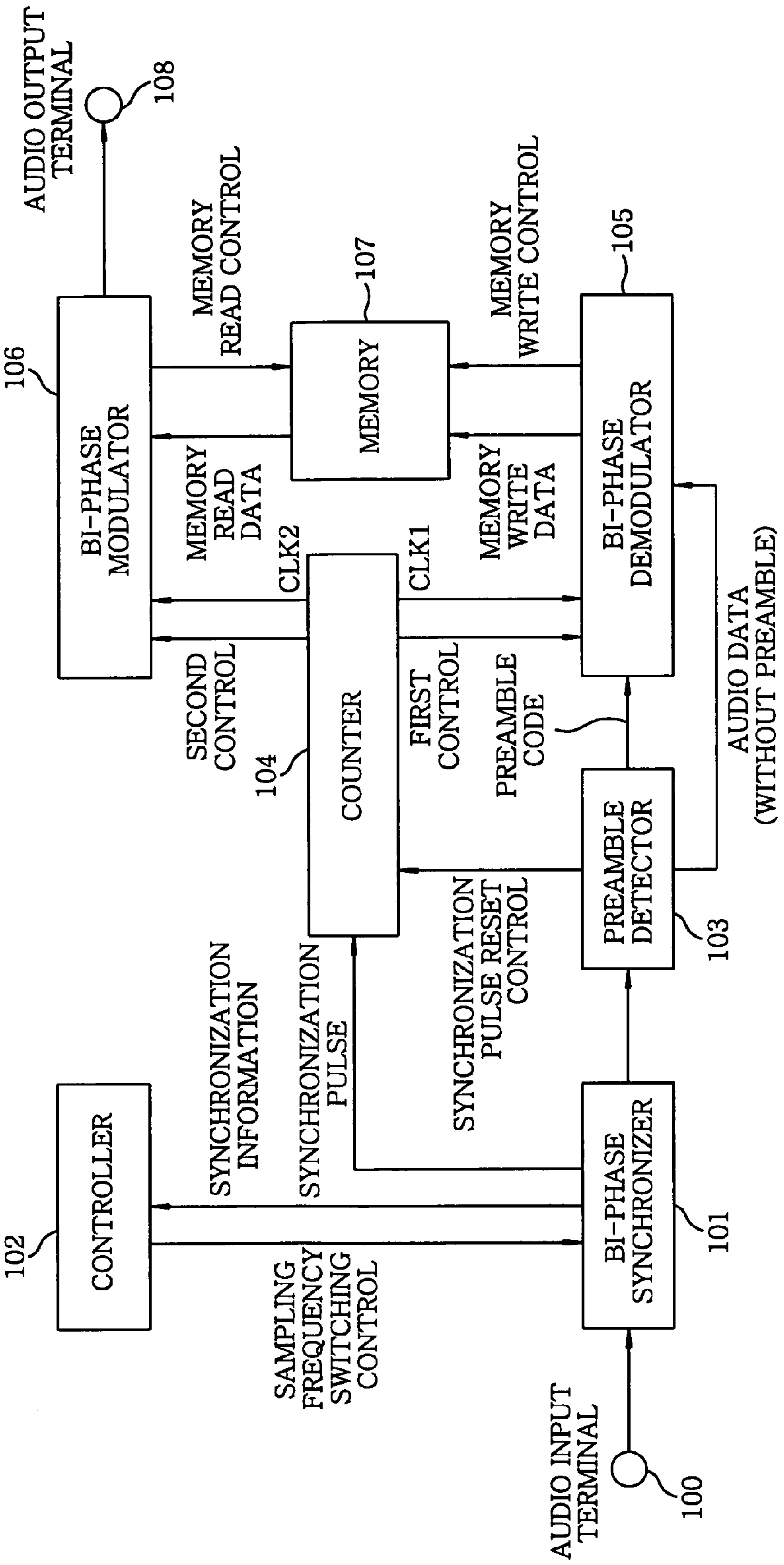
FIG. 1 shows a block diagram representing a configuration of the audio signal delay apparatus in accordance with a preferred embodiment of the present invention.

Hereinafter, a preferred embodiment in accordance with the present invention will be described with reference to accompanying drawings. FIG. 1 shows a block diagram representing a configuration of the audio signal delay apparatus in accordance with a preferred embodiment of the present invention, which includes an audio input terminal 100 for inputting an audio signal; biphase synchronizer 101; controller 102 for receiving synchronization information to switch a sampling frequency; preamble detector 103 for detecting a preamble included in the audio signal; counter 104 for counting data per clock; biphase demodulator 105; biphase modulator 106; memory 107; and audio output terminal 108.

Figure 2A:
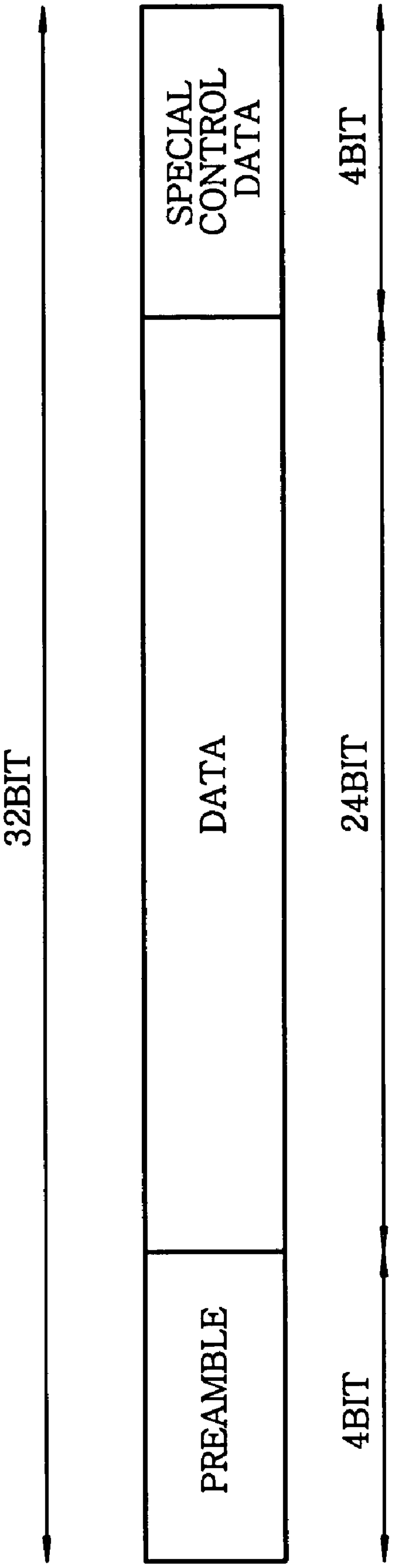
FIGS. 2A and 2B illustrate a configuration of an audio signal data.
Figure 2B:
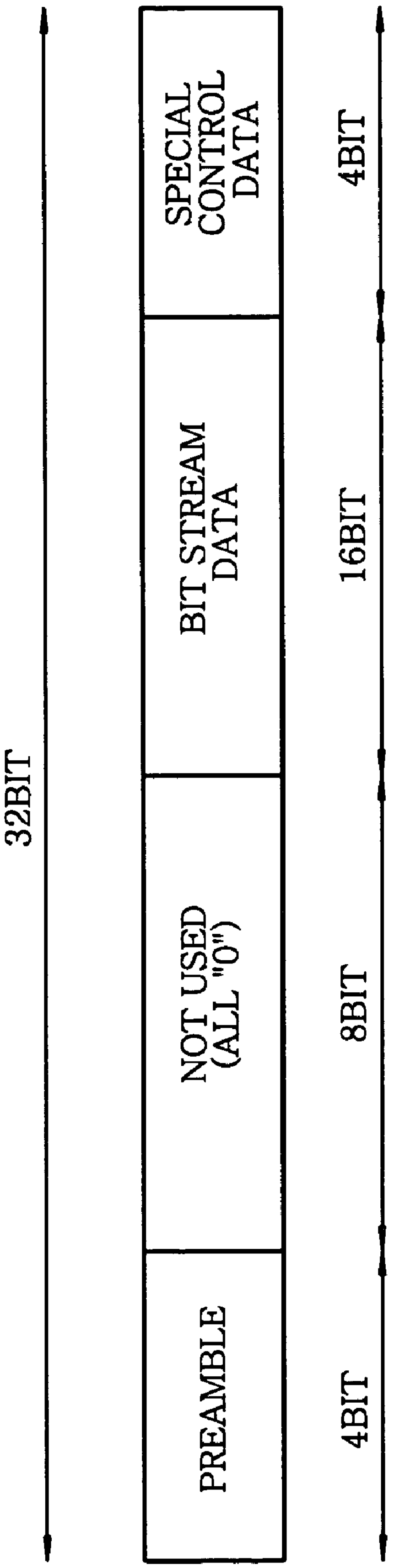

First, the audio signal inputted from audio input terminal 100 will be described. IEC60958, a transmission standard of a linear PCM format, is established as a standard format of optical digital audio output data and coaxial digital audio output data in commercial equipments. According to IEC60958, every data is divided into two subframes. As shown in FIG. 2A, each subframe has 32 bits containing a 4-bit control data, i.e., a preamble, constituting a header part; a 24-bit source data constituting a data part; and a 4-bit special control data. Herein, these data are modulated by the biphase mark modulation. Further, IEC61937 is established as a standard format in case of transmitting bitstream data of a non-linear PCM format by using an IEC60958 interface. According to IEC61937, as shown in FIG. 2B, 16-bit bitstream data is located in the audio data part where the 24-bit source data resides. Since IEC61937 is same as IEC60958 except for the data configuration, a further description thereof will be omitted.

In the following, the biphase mark modulation will be explained with reference to FIGS. 3A and 3B. The biphase mark modulation is to represent a data value "0" or "1" by changing pulses in a 2x clock, and based on the following rules:

a) Whenever a data bit ends and its next data bit starts in a signal to be modulated, a logical value thereof is set to be reversed;

b) If the signal to be modulated has a logical value of "0", a logical value of a biphase signal is set to be "00" or "11"; and c) If the signal to be modulated has a logical value of "1", a logical value of the biphase signal is set to be "10" or "01".

Figures 3A, 3B:
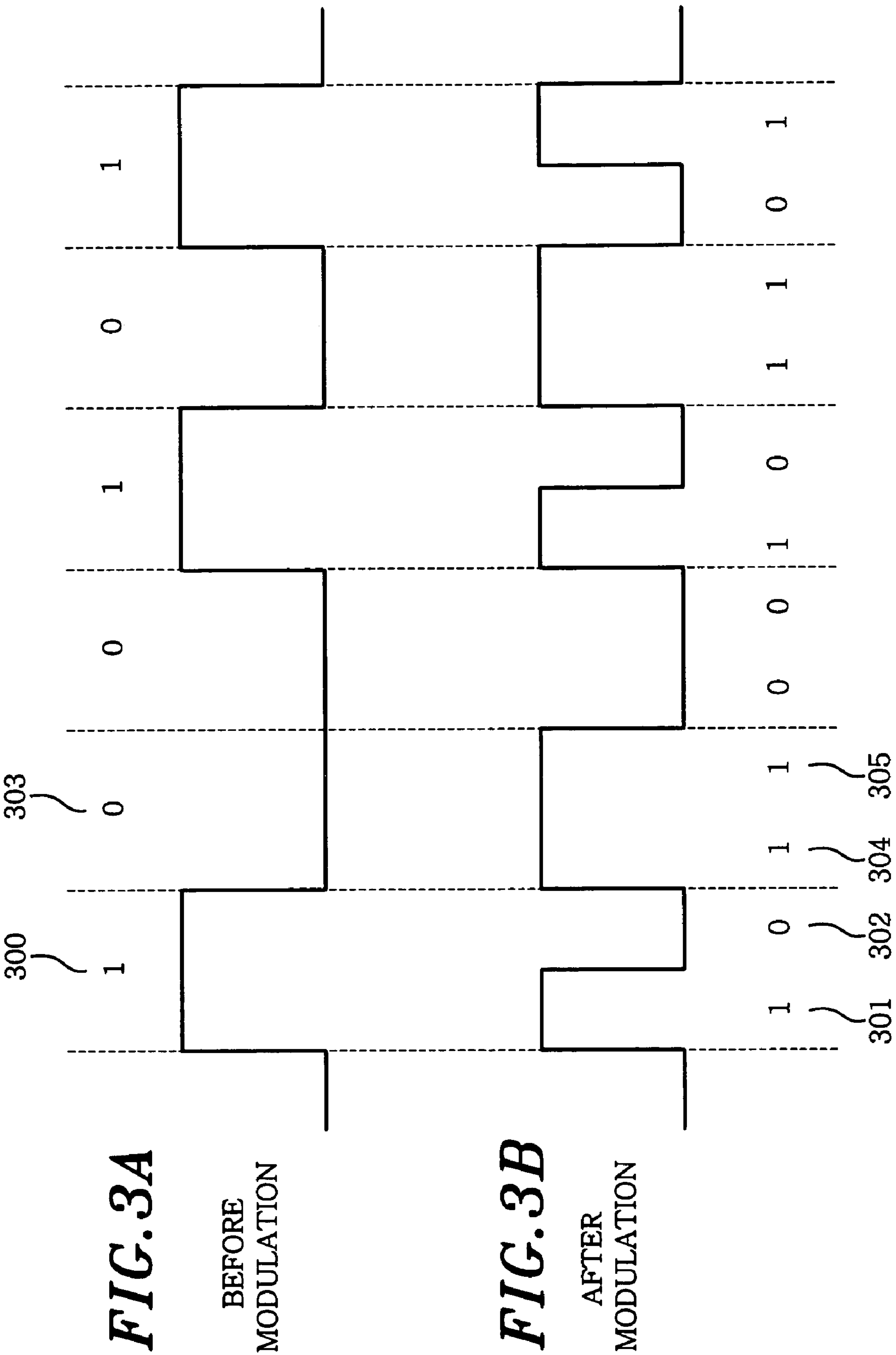
FIGS. 3A and 3B illustrate an example of a biphase mark modulation.

FIGS. 3A and 3B illustrate an example of a biphase mark modulation. FIG. 3A represents a signal of data before modulation, and FIG. 3B depicts the biphase signal shown in FIG. 3A modulated by the biphase mark modulation. When modulating a first data bit "1" (designated by 300), its modulated data bits in the biphase signal are determined as follows. First, by the rule a), the logical value of the signal to be modulated is reversed to become "1" (designated by 301). Next, since the logical value of the first data is "1", the rule c) applies to reverse the logical value again to become "0" (designated by 302). That is, the modulated data bits in the biphase signal are set to be "10" (designated by 301 and 302).

Further, when modulating a second data bit "0" (designated by 303), its modulated data bits in the biphase signal are determined in a same manner. First, the logical value of the signal to be modulated is reversed to become "1" (designated by 304). Next, since the logical value of the second data is "0", the rule b) applies to maintain the logical value to be "1" (designated by 305). That is, the modulated data bits in the biphase signal are set to be "11" (designated by 304 and 305).

The 24-bit audio data part and the 4-bit special control data part shown in FIG. 2A are modulated by the biphase mark modulation by changing pulses in the 2x clock as described above. The biphase mark modulation of the 4-bit preamble codes will be described thereafter.

Figure 4A:
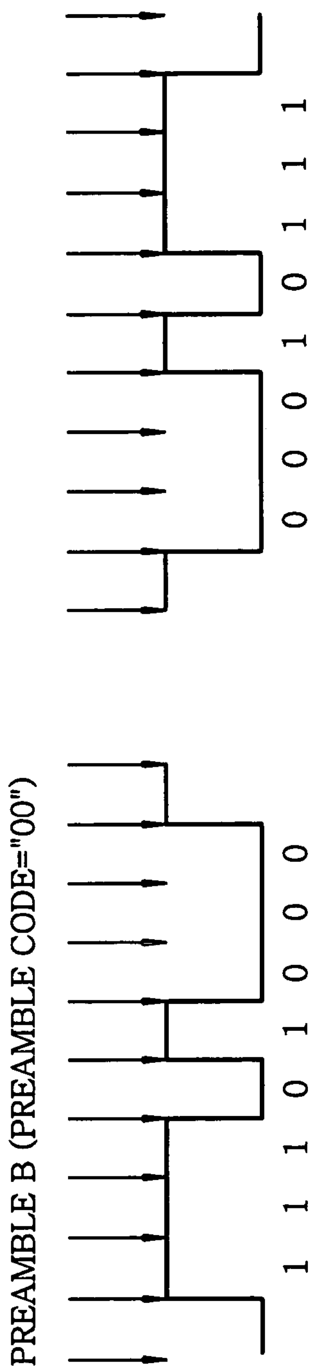
FIGS. 4A to 4C depict biphase signals of preambles.
Figure 4B:
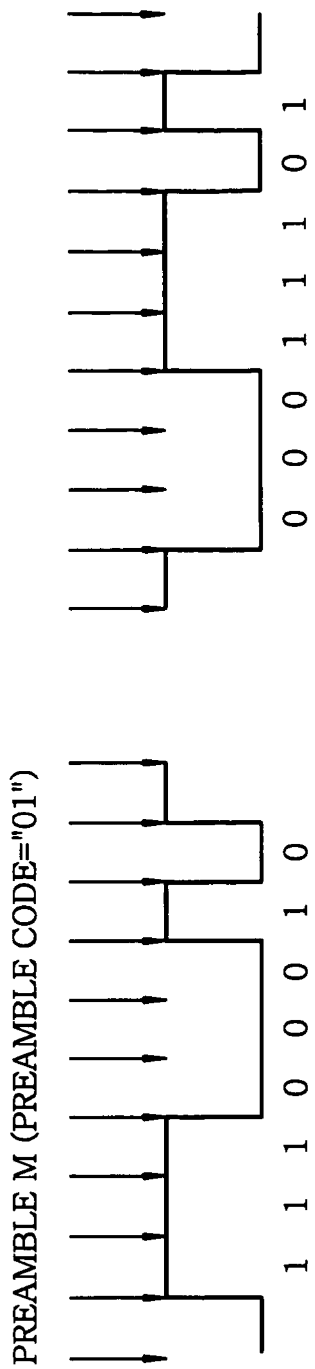
Figure 4C:
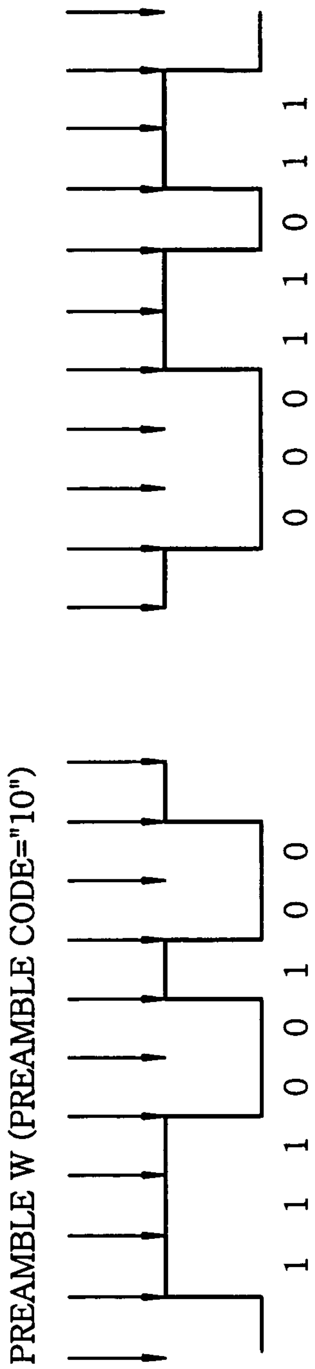

In the following, an operation of the audio signal delay apparatus will be described. When the biphase mark modulated audio signal is inputted from input terminal 100, a synchronization process is performed by biphase synchronizer 101 and controller 102, and the preamble is detected by preamble detector 103. Counter 104 receives a synchronization pulse from biphase synchronizer 101 to generate a clock CLK1 used for demodulating the biphase mark modulated serial audio signal by biphase demodulator 105 to transform it into data to be stored in memory 107 and another clock CLK2 used for modulating the data already stored in the memory by the biphase mark modulation by biphase modulator 106. Further, preamble detector 103 sends a synchronization pulse reset control signal by detecting the preamble to reset counter 104. In relation thereto, counter 104 also generates a first control signal for extracting audio data by removing the preamble from the biphase mark modulated serial audio signal by biphase demodulator 105 and a second control signal for biphase mark modulating the audio data and adding the preamble thereto by biphase modulator 106. As shown in FIG. 2A, at the head of the subframe is the 4-bit control data, i.e., the preamble. The biphase signal in this part contains a predetermined pulse pattern having three consecutive "1"s or "0"s such as "111" or "000". FIGS. 4A to 4C show biphase signals of preambles. As shown therein, there are three types of preambles, which are referred to as "B", "M" and "W" and correspond to preamble codes, i.e., preamble identifiers, "00", "01" and "10", respectively. The preamble codes will be described thereafter.

Figures 5A, 5B, 5C:
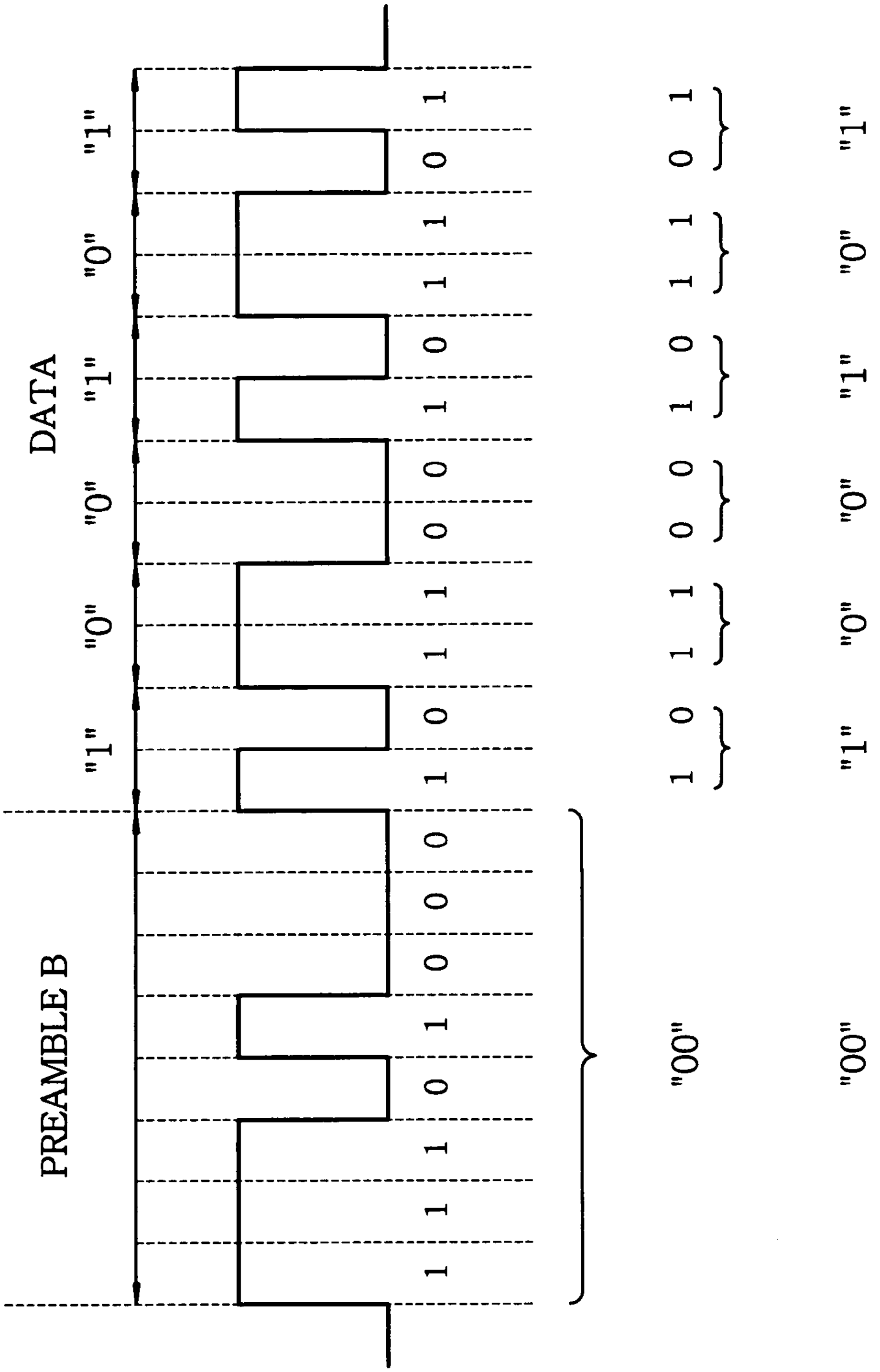
FIGS. 5A to 5C describe an exemplary operation of a biphase demodulation.

FIGS. 5A to 5C show an exemplary input signal. FIG. 5A represents a biphase mark modulated input signal; FIG. 5B describes an output signal of preamble detector 103; and FIG. 5C depicts an output signal of biphase demodulator 105.

FIG. 5A represents a biphase signal whose preamble is "B" and data part is "1, 0, 0, 1, 0, 1, . . . ". If the biphase mark modulated audio signal shown in FIG. 5A is inputted from input terminal 100, preamble detector 103 identifies the preamble by detecting three consecutive "0"s or "1"s from the inputted biphase signal.

As described above, there are three types of the preambles "B", "M" and "W" respectively corresponding to preamble codes "00", "01" and "10". After preamble detector 103 detects the preamble, a preamble code corresponding thereto is generated to be outputted by identifying the type of the preamble. FIG. 5B depicts an output signal of preamble detector 103. As shown therein, the preamble code "00" is outputted because the preamble is "B". In the audio data part and the special control data part next to the preamble, the biphase mark modulated data are directly outputted.

Further, biphase demodulator 105 demodulates the biphase mark modulated audio data and special control data based on the first control signal and the first clock inputted from counter 104. By the rules a) to c) described above, the first two bits "10" is demodulated into "1" and the next two bits "11" is demodulated into "0", as shown in FIGS. 5B and 5C. In this manner, biphase demodulator 105 outputs the preamble "00" and the demodulated data "1, 0, 0, 1, 0, 1, . . . ". Then, the outputted data are stored in memory 107.

As described above, the 8-bit preamble is transformed into the 2-bit preamble code, and the 2-bit modulated audio data and special control data are respectively demodulated into the 1-bit audio data and special control data to be stored in memory 107. In this manner, the amount of data to be buffered can be reduced by a half or below compared to a case where the biphase mark modulated data is directly stored in memory. Furthermore, when the data is read out from memory 107, it is always possible to read out the preamble first by storing a smaller amount of data compared to the conventional case, because the preamble code is stored first when the data are stored by detecting the preamble.

Hereinafter, an operation of reading out the audio signal from memory 107 will be described. Biphase modulator 106 reads out the data from memory 107 when a specified time has elapsed after the data was stored therein, and performs a modulation based on the second control signal and the second clock inputted from counter 104 in a reversed manner to the demodulation. Since the head of the data stored in memory 107 is the preamble code as described above, the 2-bit preamble code is read out first and then the biphase signal corresponding thereto is generated to be outputted. Thereafter, the subsequent audio data and special control data are outputted by being modulated by using the biphase mark modulation. Thus, the biphase signal inputted from input terminal 100 can be restored to be outputted from audio output terminal 108 after a specified time.

Figure 6:
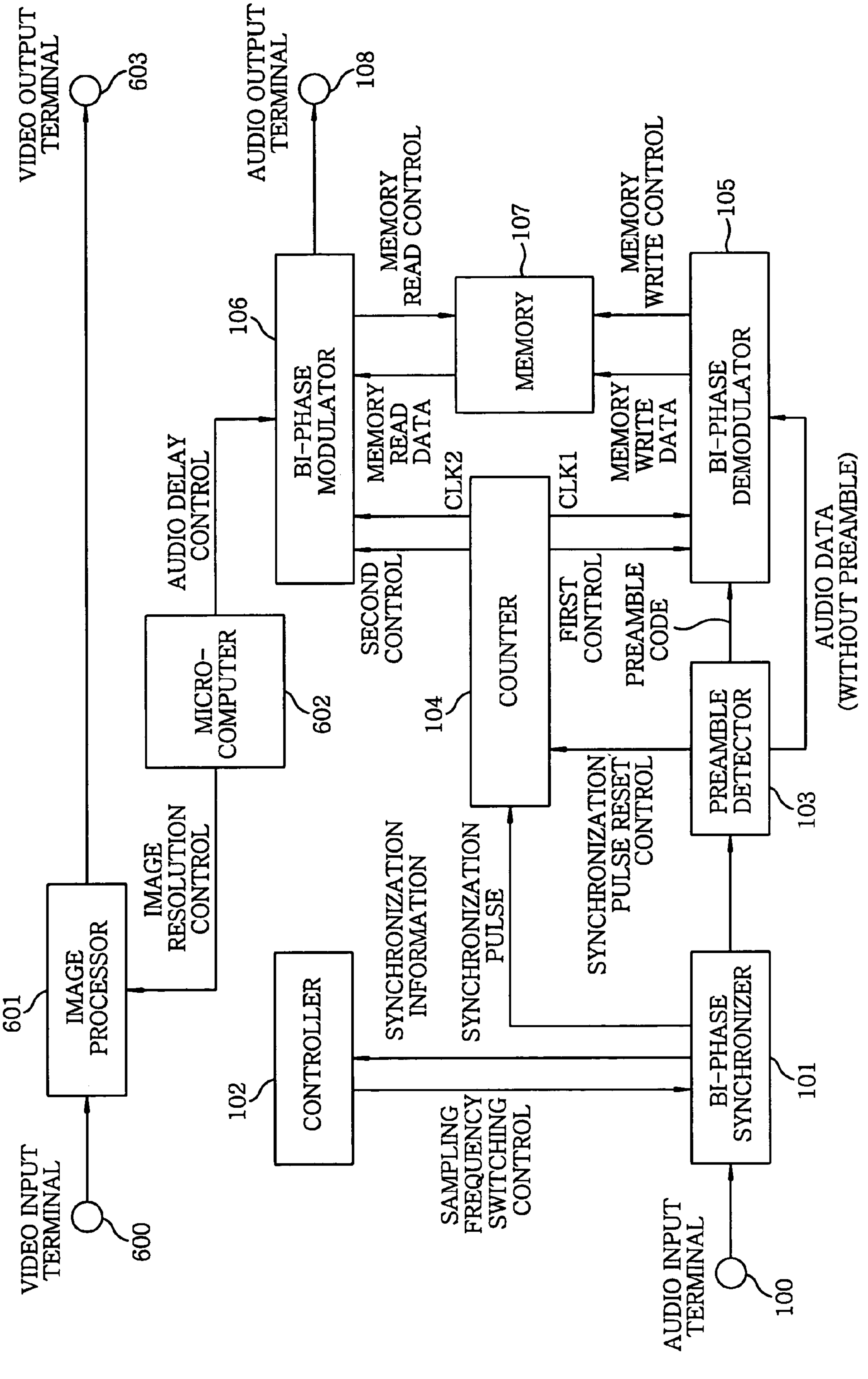
FIG. 6 shows a block diagram representing a configuration of the audio signal delay apparatus in accordance with another preferred embodiment of the present invention.

Further, the timing when biphase demodulator 106 reads out the data from memory 107 may be determined by a video signal processing unit. Hereinafter, another preferred embodiment where an audio signal is delayed when a resolution conversion is performed will be described with reference to FIG. 6. In FIG. 6, those having same reference numerals as those shown in FIG. 1 have same functions, so descriptions thereof will be omitted. The audio signal delay apparatus in FIG. 6 further includes video input terminal 600; image processor 601 for performing such processes as a resolution conversion on a video signal; microcomputer 602 for controlling a resolution of the video signal and an amount of an audio signal delay time; and video output terminal 603.

When a video signal corresponding to the audio signal is inputted from video input terminal 600, microcomputer 602 sends an image resolution control signal to image processor 601 to convert a resolution of the inputted video signal into an optimal resolution for a TV set to be connected and an audio delay control signal to biphase modulator 106 so that an audio signal delay time can be determined based on a video signal delay time. Image processor 601 performs operations such as the resolution conversion or a scanning mode conversion. More specifically, the video signal delay time by the resolution conversion in image processor 601 is given in advance, and microcomputer 602 determines the timing when the data is read out from memory 107 based on the processing time of biphase modulator 106 to send the audio delay control signal to biphase modulator 106 to set the amount of the delay time.

It is also possible to employ a table of delay times for some kinds of resolution conversions such as a resolution conversion from 525*i* to 1080*i* or a resolution conversion from 720*p* to 525*i* so that microcomputer 602 may send the audio delay control signal to biphase modulator 106 with reference to the table to set the amount of the delay time.

Biphase modulator 106 determines the timing when the data is read out from memory 107 in response to the audio delay control signal from microcomputer 602, and performs the modulation by reading out the data from memory 107. Thus, the biphase mark modulated audio signal outputted from audio output terminal 108 can be played in a manner synchronous to the video signal outputted from video output terminal 603.

The audio signal delay apparatus in accordance with the present invention can reduce an amount of audio data to be stored in the memory, thereby making it possible to reduce a memory capacity for a delay process.

In accordance with the present invention, when storing the audio signal modulated by the biphase mark modulation in a buffer, a sufficient delay time can be secured with a small memory capacity by transforming data in a preamble part, i.e., a header part, and demodulating a data part to be stored in the memory.

While the invention has been shown and described with respect to the preferred embodiments, it will be understood by those skilled in the art that various changes and modification may be made without departing from the scope of the invention as defined in the following claims.

What is claimed is:

1. A signal processing apparatus comprising:

an audio signal delay apparatus which includes:

a header part detection unit for receiving an audio signal modulated by biphase mark modulation to identify a header part of the audio signal and output identification data;

a biphase demodulation unit for demodulating a data part of the audio signal to store the identification data and the demodulated data part in a memory; and a biphase modulation unit for reading out the identification data from the memory to reconstruct the header part, reading out the data part from the memory to modulate the data part by the biphase mark modulation, and combining the reconstructed header part with the modulated data part to output the combined data.

2. The apparatus of claim 1, wherein the identification data is represented by two bits.

3. The apparatus of claim 1, further comprising:

an image processing unit for processing a video signal; and a synchronization unit for extracting synchronization data from an output signal of the image processing unit to send a read-out command to the biphase modulation unit, wherein the biphase modulation unit starts a read-out from the memory based on the read-out command.

4. An audio signal delay method comprising the steps of:

receiving an audio signal modulated by biphase mark modulation;

identifying a header part of the audio signal;

demodulating a data part of the audio signal to store identification data and the demodulated data part in a memory;

reading out the identification data from the memory to reconstruct the header part after a specified time;

reading out the data part from the memory to modulate the data part by the biphase mark modulation; and combining the reconstructed header part with the modulated data part to output the combined data.

* * * * *